United States Patent
Choi et al.

(10) Patent No.: US 11,205,811 B2
(45) Date of Patent: Dec. 21, 2021

(54) COOLING STRUCTURE FOR BATTERY

(71) Applicants: Hyundai Motor Company, Seoul (KR); Kia Motors Corporation, Seoul (KR)

(72) Inventors: Jun-Seok Choi, Gyeonggi-do (KR); Byung-Su Kim, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 41 days.

(21) Appl. No.: 16/212,800

(22) Filed: Dec. 7, 2018

(65) Prior Publication Data

US 2019/0260103 A1 Aug. 22, 2019

(30) Foreign Application Priority Data

Feb. 19, 2018 (KR) .................. 10-2018-0019475

(51) Int. Cl.
| | |
|---|---|
| *H01M 10/6556* | (2014.01) |
| *H01M 10/613* | (2014.01) |
| *H01M 10/625* | (2014.01) |
| *H01M 10/647* | (2014.01) |
| *H01M 10/6551* | (2014.01) |
| *H01M 10/6563* | (2014.01) |
| *H01M 50/20* | (2021.01) |
| *B60K 6/28* | (2007.10) |
| *B60L 58/26* | (2019.01) |

(52) U.S. Cl.
CPC ..... *H01M 10/6556* (2015.04); *H01M 10/613* (2015.04); *H01M 10/625* (2015.04); *H01M 10/647* (2015.04); *H01M 10/6551* (2015.04); *H01M 10/6563* (2015.04); *H01M 50/20* (2021.01); *B60K 6/28* (2013.01); *B60L 58/26* (2019.02); *B60Y 2200/91* (2013.01); *B60Y 2200/92* (2013.01); *B60Y 2306/05* (2013.01); *B60Y 2400/112* (2013.01); *H01M 2220/20* (2013.01)

(58) Field of Classification Search
CPC ............. H01M 10/613; H01M 10/625; H01M 10/647; H01M 10/6551; H01M 10/6556; H01M 10/6563; H01M 2/1077; H01M 2220/20; H01M 50/20; B60Y 2400/112; B60Y 2200/91; B60Y 2200/92; B60Y 2306/05; B60K 6/28; B60L 58/26
See application file for complete search history.

(56) References Cited

U.S. PATENT DOCUMENTS

2013/0071719 A1* 3/2013 Chung ................ H01M 10/613
429/120

FOREIGN PATENT DOCUMENTS

KR 10-1528007 6/2015

* cited by examiner

*Primary Examiner* — Mayla Gonzalez Ramos
(74) *Attorney, Agent, or Firm* — Mintz Levin Cohn Ferris Glovsky and Popeo, P.C.; Peter F. Corless

(57) ABSTRACT

A cooling structure for a battery is provided. The cooling structure includes a plurality of stacked battery cells and tabs are formed on one side or both sides of electrode of each of the battery cells. Additionally, a cooling passage is configured to accommodate the tabs in an inner space thereof and the tabs operate as cooling fins in the cooling passage.

11 Claims, 4 Drawing Sheets

COOLING STRUCTURE FOR BATTERY

CROSS-REFERENCE TO RELATED APPLICATIONS

This application claims priority to Korean Patent Application No. 10-2018-0019475, filed on Feb. 19, 2018, which is incorporated herein by reference in its entirety.

BACKGROUND

Field of the Disclosure

The present disclosure relates to a cooling structure for a battery, and more particularly, to a cooling structure for a battery, which employs a tab cooling method in which a tab itself is configured in the form of a cooling fin to cool the tab.

Description of Related Art

A method for cooling a high-voltage battery system for a vehicle as illustrated in FIGS. 1A-1B of the related art is mainly divided into an air cooling method and a water cooling method, and each of them is divided into an indirect cooling method and a direct cooling method. Among battery systems employed in a hybrid electric vehicle (HEV), a plug-in hybrid electric vehicle (PHEV) and an electric vehicle (EV), a HEV battery system has adopted particularly a direct air cooling method or an indirect air cooling method.

Therefore, to realize the air cooling method, the direct air cooling method in which an air gap acting as a particular void is formed between battery cells type to allow air to flow one side or both sides of the cell to cool the cells or the indirect air cooling method in which a heat sink (e.g., aluminum plate) is disposed between the battery cells to be in contact with surfaces of the cells and heat conducted by the heat sink is cooled by a cooling fin is employed.

In other words, the direct air cooling method in which cooling air flows directly on a surface of a cell pouch to cool the cell pouch and the indirect air cooling method in which heat conducted to the cooling plate placed between the cells is cooled by the cooling fin are employed. In this direct air cooling method, a flow passage gap is required, and indirect air cooling method requires the heat sink having a thickness of 0.6 to 1.0 t. Therefore, the direct and indirect air cooling methods are disadvantageous in terms of volume and weight energy densities.

When employing the direct air cooling method, there is a disadvantage in that an air gap is required as a flow passage space for cooling each cell, thereby decreasing the volume energy density. Additionally, even when using the indirect air cooling method, a separate heat sink is required thus decreasing the volume energy density, which results in decreasing the volume energy density of the battery system.

The contents described in section are to merely help the understanding of the background of the present disclosure, and may include what is not previously known to those skilled in the art to which the present disclosure pertains.

SUMMARY

The present disclosure provides a cooling structure for a battery, which does not require an air gap (has been used in the direct air cooling method) and a heat sink (has been used in the direct air cooling method) between cell tabs having a high current density and between cells for cooling the tab (electrode) of the cell and may maximize a volume energy density of a battery system in that that much energy should be stored in a restricted space of a vehicle.

In addition, another object of the present disclosure is to provide a cooling structure for a battery, in which a cell tap is formed as a cooling fin which does not require a cooling flow passage between cells and a separate cooling plate for indirect cooling. In order to achieve the above objects, the present disclosure provides a unidirectional cooling structure for a battery, in which a tab formed at one side of an electrode of a cell functions as a cooling fin and a cooling passage is formed to accommodate the tab in an inner space thereof.

In addition, the present disclosure provides a bidirectional cooling structure for a battery, in which tabs formed at both sides of an electrode of a cell function as cooling fins and cooling passages are formed to accommodate the corresponding tabs in inner spaces thereof, respectively. Since the temperature of the tab is a highest in the general cell, the present disclosure configured as described above employs the tab cooling method which is efficient in terms of the cooling efficiency.

Furthermore, although it is necessary to configure a flow gap of about 3 mm in a thickness direction per an existing cell, since an air gap is not required when the tab cooling method is applied in the configuration according to the present disclosure, the present disclosure has the effect of increasing the volume energy density by about 20% owing to the absence of air gap or a cooling plate. In addition, the present disclosure may reduce the cost by about 10% or more due to an increase in the volume energy density.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1A:
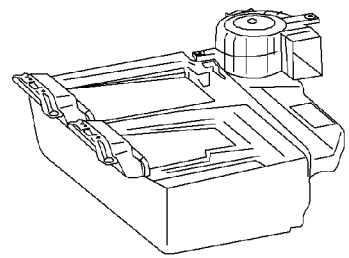
FIG. 1A is a perspective view illustrating an entire configuration of a conventional cooling structure for a battery according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to fully understand the present disclosure, exemplary embodiments of the present disclosure will be described with reference to the accompanying drawings. The exemplary embodiments of the present disclosure may be modified in various forms, and the scope of the present disclosure should not be construed as being limited to the embodiments described in detail below. The present exemplary embodiments are provided to enable those skilled in the art to more fully understand the present disclosure. Therefore, shapes and the like of elements in the drawings may be exaggerated in order to emphasize clearer explanation. It should be noted that the same elements in the drawings are denoted by the same reference numeral. Detailed descriptions of well-known functions and configurations that may unnecessarily obscure the gist of the present disclosure are omitted.

Figure 1B:
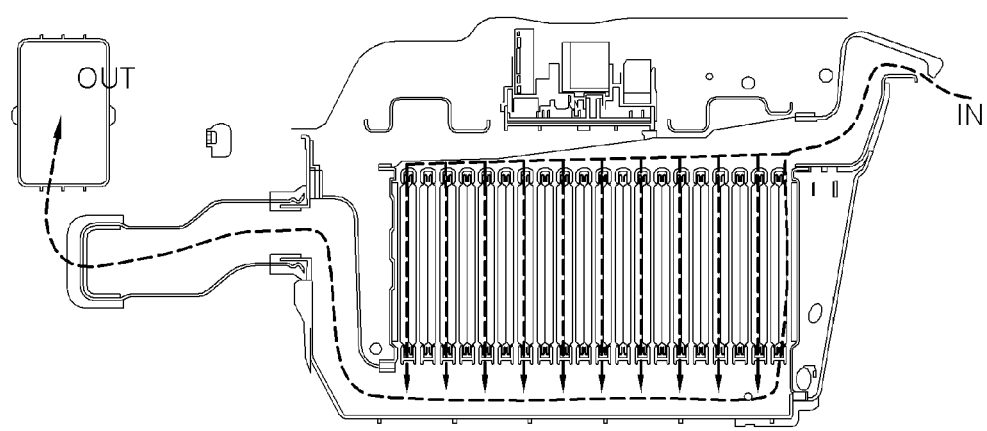
FIG. 1B is a cross-sectional view of the cooling structure for the battery shown in FIG. 1A and shows air flow in the cooling structure according to the related art.

FIG. 1A is a perspective view illustrating an entire configuration of a conventional cooling structure for a battery, and FIG. 1B is a cross-sectional view of the cooling structure for the battery shown in FIG. 1A and shows air flow in the cooling structure according to the related art. In other words, cooling air flowing into a first side of a battery cell through a blower is diverged and passes a surface of each cell pouch to perform a direct cell cooling operation, and then is merged at a second side of the battery cell and discharged from a high voltage battery system. Therefore, an air gap is required for an air-cooling flow passage space for each cell, which causes a disadvantage in that a volume energy density is decreased.

In the present disclosure, as illustrated in FIGS. 2 and 3, a tab 10 operates as a cooling fin to provide an integrally formed cooling structure of a battery. The tab 10 may be formed by protruding an end of an electrode of a cell, and the tab 10 may protrude to the outside of a battery cell pouch and thus, the tab may be in contact with external air. In particular, cooling may be achieved by passing cooling air through the tabs and the tabs may be located in a cooling passage 20 to form air flow in a direction orthogonal to an arrangement direction of the cell. The tabs may be formed on one side of the cell or on both sides of the cell. The tabs formed on one side of the cell may be referred to as unidirectional tabs, and the tabs formed on both sides of the cell may be referred to as bidirectional tabs.

In other words, the present disclosure does not employ a direct air cooling method in which a certain space (air gap) is formed between the battery cells and air flows in a cell surface direction to cool the cells, but cools the tab 10 operating as a cooling fin, which is advantageous in terms of volume/weight energy density. It is advantageous in terms of volume/weight energy density to cool the tab 10 without employing a cooling plate method for cooling heat conducted to a cooling plate disposed between the cells.

Compared to an entire battery cell 22, a temperature of the tab 10 may be a highest temperature. Accordingly, external air should be supplied directly to the tab 10. In other words, air may be directed to flow in a direction perpendicular to one side surface of the tab 10 functioning as the cooling fin to cool the tab.

In addition, the present disclosure may include an additional cooling section extending and coupled to the tab 10. The additional cooling section may be a separate device for increasing a cooling area of the tab 10, and may secure an addition cooling area when cooling is insufficient only by the tab. The tab 10 may be formed to extend in a longitudinal direction of the cell by the additional cooling section, and the additional cooling section may maximize the cooling efficiency of the battery cell as the cooling fin, and may allow the tab to have various shapes.

Figure 2A:
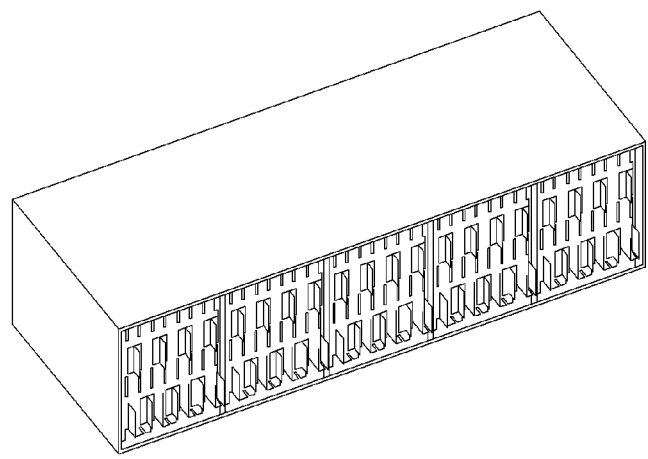
FIG. 2A is a view showing flow of cooling air employed in bidirectional tabs according to one exemplary embodiment of the present disclosure.
Figure 2B:
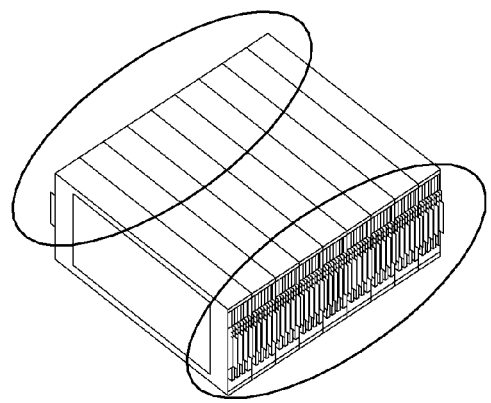
FIG. 2B is a view illustrating a configuration in which the bidirectional tabs are formed on both sides of battery cell according to one exemplary embodiment of the present disclosure.
Figure 2C:
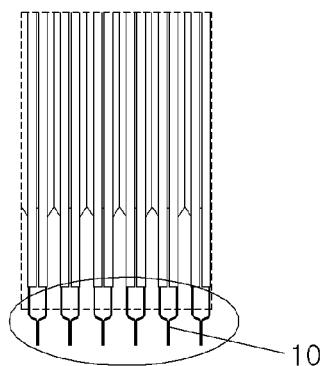
FIG. 2C is a view showing a configuration in which the tabs are extended from the battery cells and arranged in parallel according to one exemplary embodiment of the present disclosure.

FIG. 2A shows the entire cooling structure for the battery including the battery cell having the bidirectional tabs, FIG. 2B shows the bidirectional tabs (indicated by the circles) formed on both sides of the battery cell, and FIG. 2C is an enlarged view of the tabs in FIG. 2B and shows a configuration in which the tabs are arranged in parallel to enable the tabs to substantially function as the cooling fins.

In FIG. 2A, the tabs 10 may be formed on both sides of the cell 22 in both directions, and the cooling passages 20 may be formed on both sides of the battery cell to accommodate the tabs formed on both sides the cell in inner spaces thereof. In other words, the cooling passages may be formed on both sides of the cell to guide the air flow and thus, the tabs formed on both sides of the cell may be arranged in parallel to each other to function as the cooling fin. The cooling passage 20 of FIG. 2A may be connected to a blower 40 via an outlet manifold 28. In other words, an inlet manifold 26 into which external air flows may be formed at an inlet port of the cooling passage 20, and the outlet manifold 28 may be provided at an outlet port of the cooling passage to discharge air through the blower 40.

In the cooling passage 20 configured as above, air may flow in a direction perpendicular to surfaces of the tabs 10 which are arranged like the cooling fins, and may come in contact with the tabs to thus cool the tabs. A dashed line in FIG. 2B represents the flow of cooling air, and the inlet manifold 26 may be disposed above the cooling passage, and accordingly, warm air rises and cold air descends due to convection. In the configuration shown in FIG. 2A, since the tabs may be formed on both sides of the cell in both directions, the cooling passages may be formed on both sides, and the inlet manifolds 26 and the outlet manifolds 28 may be disposed on both sides of the cell, respectively, such that the inlet manifolds 26 are symmetrical to each other and the outlet manifolds 28 are symmetrical to each other. In addition, air may be discharged through the blower 40 in a direction away from a cell housing. In other words, the inlet manifold and a discharge port of the blower may be directed in opposite directions.

Figure 3A:
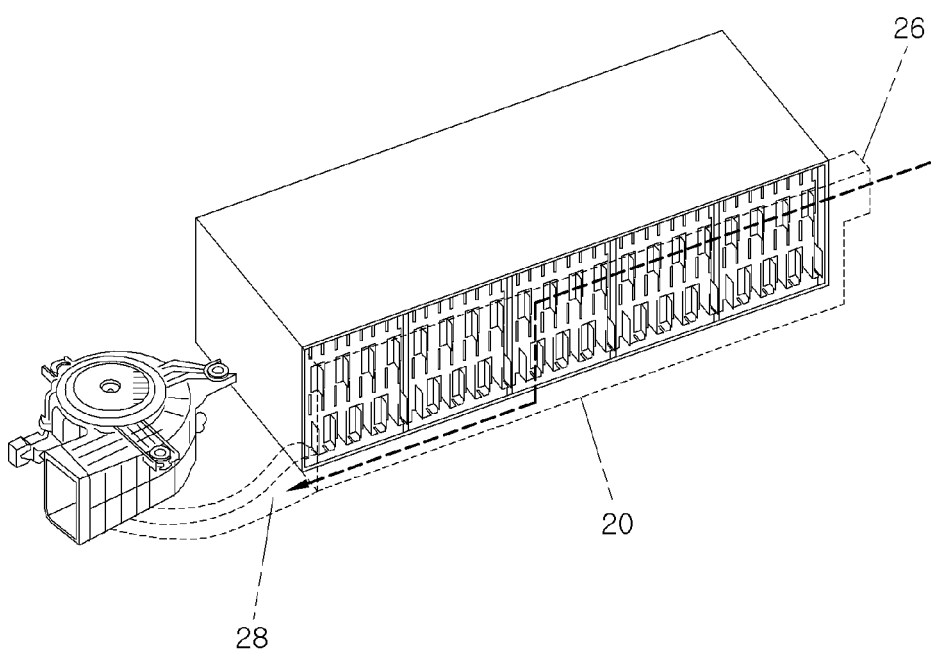
FIG. 3A is a view showing a unidirectional tab formed on the cells according to one exemplary embodiment of the present disclosure.
Figure 3B:
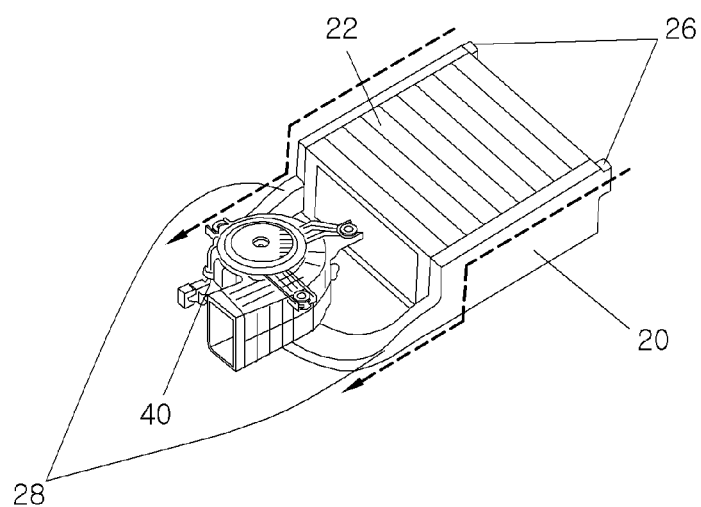
FIG. 3B shows air flow formed by the unidirectional tabs according to one exemplary embodiment of the present disclosure.

FIG. 3A shows the configuration in which the tabs are formed on only one side of the battery cells, the tabs are formed in one direction. FIG. 3B shows the configuration in which the cooling passage 20 is formed on only one side of the battery cell to accommodate the unidirectional tabs in an inner space thereof. Even in the battery cell on which the unidirectional tab is formed, like the configuration shown in FIG. 2A, the inlet manifold 26 into which external air flows is formed, and the outlet manifold 28 may be provided at the outlet port the cooling passage 20 and thus, air may be discharged through the blower 40 in a direction away from the cell housing. In other words, similar to the battery cell on which the bidirectional tabs are formed, the inlet manifold and the discharge port of the blower may face opposite directions.

Furthermore, the tab 10 may be the straight-shaped cooling fin, or the tab may be further extended or may include additional configurations to obtain various shaped cooling fins. In addition, from the unidirectional tab formed on one side of the battery cell or the bidirectional tabs formed on both sides of the battery cell, a configuration in which the tab is connected to be energized from the outside of the battery housing may be achieved. For example, the tab 10 may pass through the cooling passage 20 to allow the tab to be energized from the outside.

In addition, the tab 10 may be formed in the form of the cooling fin and attached to the cell as one integrated part. In other words, to enhance the cooling efficiency, the tab may be formed to extend from the battery cell or the tap may be attached to a conventional tab of the battery cells in the form of the cooling fin. The cooling passage may be installed to perform natural cooling using a running wind without providing the blower.

Although it is necessary to configure a flow gap of about 3 mm a thickness direction in an existing cell, since an air gap is not required when the tab cooling method is applied in the configuration according to the above-described present disclosure, the present disclosure has the effect of increasing the volume energy density by about 20% owing to the absence of air gap or a cooling plate. In addition, since the temperature of the tab is the highest in the general cell, the present disclosure employs the tab cooling method which is efficient in terms of the cooling efficiency, and the cost is reduced by about 10% or more due to an increase in the volume energy density.

Although the present disclosure has been described with a focus on novel features of the present disclosure applied to various exemplary embodiments, it will be apparent to those skilled in the art that various deletions, substitutions, and changes in the form and details of the apparatus and method described above may be made without departing from the scope of the present disclosure. Accordingly, the scope of the present disclosure is defined by the appended claims rather than by the foregoing description. All modifications within the equivalent scope of the appended claims are embraced within the scope of the present disclosure.

What is claimed is:

1. A cooling structure for a battery, comprising:
 a plurality of stacked battery cells;
 a plurality of tabs formed on one side of an electrode of each of the battery cells; and
 a cooling passage configured to accommodate the tabs in an inner space thereof,
 wherein the tabs operate as cooling fins in the cooling passage,
 wherein a length and a height of the cooling passage are configured to be same as a length and a height of the battery cells,
 wherein the cooling passage is installed on a first side of the battery cells, apart from a cell housing,
 wherein a second side of the battery cells, on which the cooling passage is not installed, are covered by the cell housing,
 wherein the second side of the battery cells and the cell housing are in contact with each other,
 wherein the cooling passage is configured to pass through cooling air for cooling the tabs,
 wherein an inlet manifold is formed at an upper end of the inlet port of the cooling passage and an outlet manifold is formed at a lower end of an outlet port of the cooling passage, and
 wherein an upper end of the inlet manifold of the cooling passage is configured at the same height as an upper end of the cell housing, and a lower end of the outlet manifold of the cooling passage is configured at the same height as a lower end of the cell housing.

2. The cooling structure for the battery of claim 1, wherein the flow passage is formed in a direction perpendicular to an arrangement of the cells.

3. The cooling structure for the battery of claim 1, wherein the outlet manifold is connected to a blower.

4. The cooling structure for the battery of claim 3, wherein the blower is configured to discharge air in a direction away from the cell.

5. The cooling structure for the battery of claim 4, wherein the inlet manifold and a discharge port of the blower are directed in opposite directions.

6. A vehicle having a battery with a cooling structure according to claim 1.

7. The vehicle of claim 6, wherein the flow passage is formed in a direction perpendicular to an arrangement of the cells.

8. The vehicle of claim 7, wherein an inlet manifold is formed at an upper end of an inlet port of the cooling passage and an outlet manifold is formed at a lower end of an outlet port of the cooling passage.

9. The vehicle of claim 8, wherein the outlet manifold is connected to a blower.

10. The vehicle of claim 9, wherein the blower is configured to discharge air in a direction away from the cell.

11. The vehicle of claim 10, wherein the inlet manifold and a discharge port of the blower are directed in opposite directions.

* * * * *